Aug. 2, 1932.  A. B. CUNNINGHAM ET AL  1,870,000
MULTIPLE DRAFT AND PRESSURE GAUGE
Original Filed April 13, 1925  2 Sheets-Sheet 1

Aug. 2, 1932.   A. B. CUNNINGHAM ET AL   1,870,000
MULTIPLE DRAFT AND PRESSURE GAUGE
Original Filed April 13, 1925    2 Sheets-Sheet 2
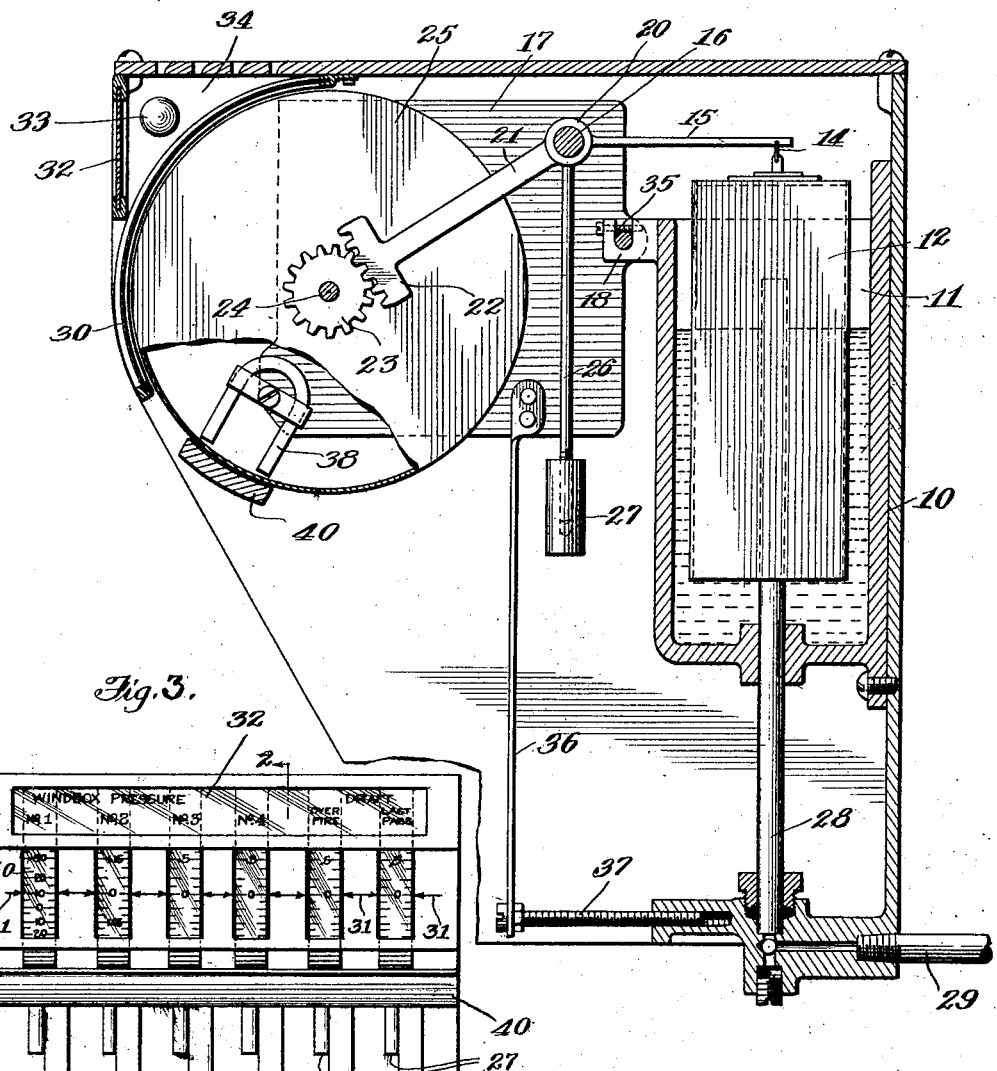
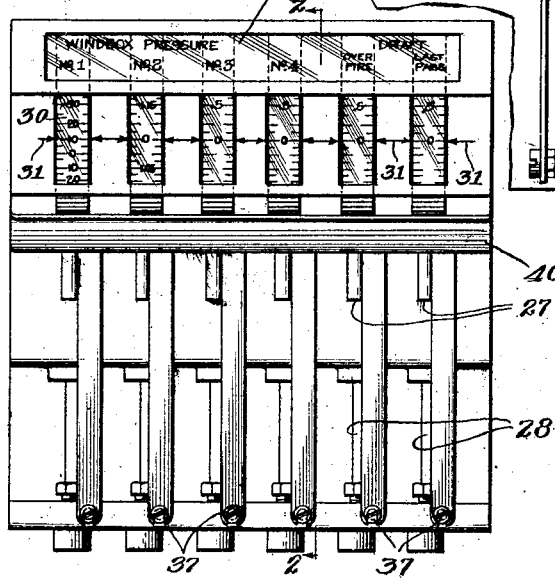

Patented Aug. 2, 1932

1,870,000

UNITED STATES PATENT OFFICE

ARTHUR B. CUNNINGHAM AND ALBERT F. SPITZGLASS, OF CHICAGO, ILLINOIS, ASSIGNORS TO REPUBLIC FLOW METERS COMPANY, OF CHICAGO, ILLINOIS, A CORPORATION OF ILLINOIS

MULTIPLE DRAFT AND PRESSURE GAUGE

Refiled for abandoned application Serial No. 22,630, filed April 13, 1925. This application filed July 13, 1925. Serial No. 43,161.

This application is a substitute for our prior application, Serial No. 22,630, filed April 13, 1925, and contains improvements over the device shown in the prior application that have been found to be essential for practical operation of the invention.

This invention relates to an instrument for indicating the operating conditions of apparatus such as boiler furnaces in which various portions of the apparatus are subjected to different pressures, some of which are usually drafts below atmospheric pressure and others of which are greater than atmospheric pressure.

One of the objects of the invention is to provide an indicating instrument in which a number of pressure conditions may be indicated by an instrument having a plurality of indicators arranged closely adjacent one another.

A further object is to provide an indicator which shall be of improved construction and operation and which shall be economical to manufacture, and convenient and efficient to operate.

The invention is exemplified in the combination and arangement of parts shown in the accompanying drawings and described in the following specification, and it is more particularly pointed out in the appended claims.

In the drawings—

Fig. 2 is a section substantially on line 2—2 of Fig. 1; and

Fig. 3 is a front elevation of the instrument shown in Figs. 1 and 2.

Figure 1:
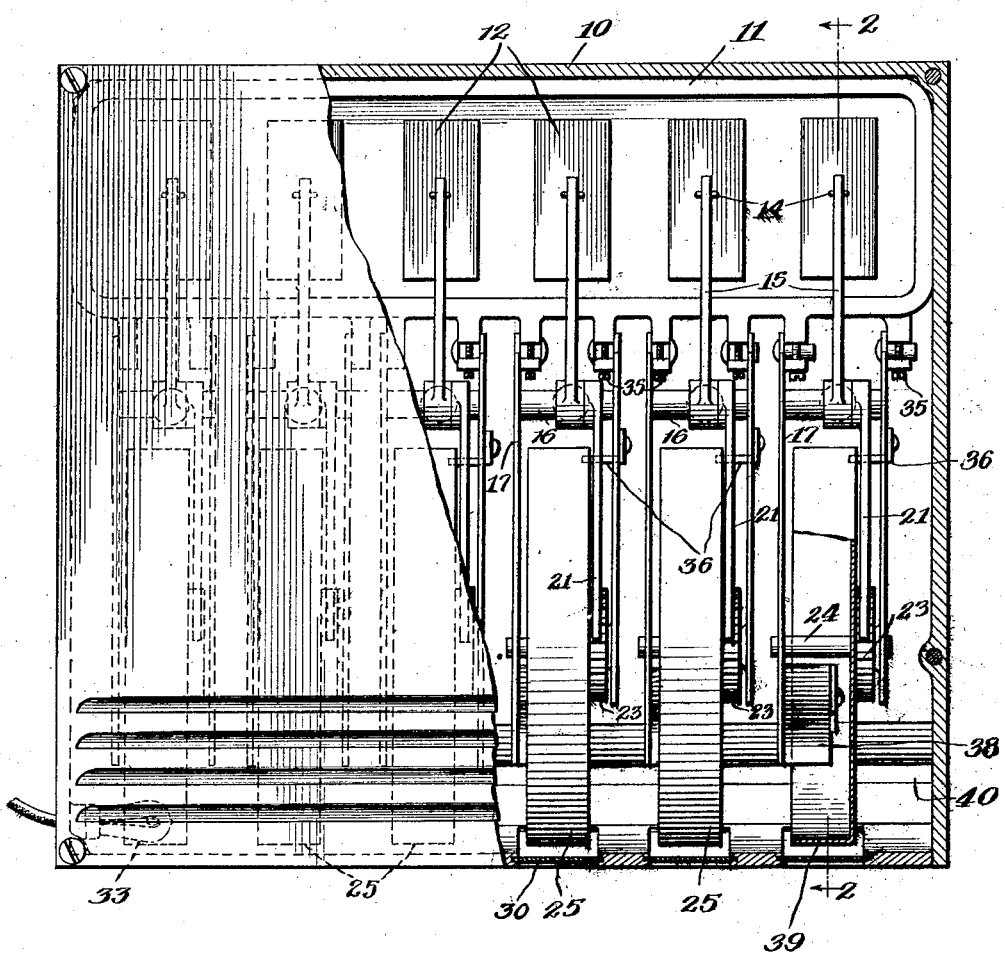
Fig. 1 is a top plan view of a combined draft and pressure instrument showing one embodiment of the present invention.

In the operation of many forms of apparatus, such as boiler furnaces, the efficient operation depends upon the pressures in the various parts of the apparatus. In some parts of the apparatus there will be drafts which will reduce the pressure to an amount below atmospheric pressure. In order that the operator may know the condition of operation in all parts of the apparatus it is desirable to have an instrument which will indicate the various important pressures so that they may show the condition in each compartment. Such an instrument must be so arranged that the operating parts may be brought into compact space thus making it possible to arrange the indicators close together. One form of apparatus which has been found very convenient and efficient for this purpose is illustrated in the accompanying drawings.

A base plate or frame 10 carries an elongated well or reservoir 11 having inverted floats or bells 12 suspended therein, the lower ends of the floats being sealed by oil or other suitable liquid. The upper ends of the floats 12 are connected by pivot links 14 to lever arms 15 pivotally mounted on shafts 16 which are fixed between plates 17 pivotally mounted on lugs 18 which project forwardly from the well 11. Each of the arms 15 is connected to a sleeve 20 having an arm 21 extending forwardly therefrom. The arm 21 carries a gear segment 22 which meshes with a pinion 23 secured to a shaft 24 journaled in the forward edges of the plates 17. Each of the shafts 24 carries a numeral wheel 25 having graduations thereon to indicate the reading of the instrument. A pendulum rod 26 extends downwardly from each of the sleeves 20 and is provided with an adjustable weight 27 for returning the numeral wheel to normal zero and for calibrating the instrument.

Pipes 28 extend upwardly through the bottom of the well 11 and open in the interior of each of the respective floats. The lower wall of the frame 10 is bored to form a connection between each pipe 28 and a connecting tube 29 which leads to a particular portion of the apparatus, the pressure of which is to be indicated by the instrument unit with which the pipe 28 is connected. The front portion of each of the instrument units is covered by a glass 30 through which the graduations on the numeral wheel may be seen. Markings 31 are provided on the instrument frame to indicate the reading point.

The section shown in Fig. 1 shows a draft unit of the instrument and it will be apparent that when the pipe 28 is connected with a chamber in which the pressure is less than atmospheric the exhaustion of air from the float 12 will permit the exterior air pressure to force the float downwardly into the liquid 13. This will rotate the lever arms 15 and 21 in a clockwise direction, as shown in Fig. 2, and impart a downward movement to the graduations on the front face of the numeral wheel 25. The amount of movement will depend upon the degree of vacuum being measured and the reading on the front of the instrument will correspond to the draft within the chamber to which the particular unit is connected. As many instruments may be arranged side by side as there are compartments in a particular installation, the pressures of which are to be indicated. A glass panel 32 may be arranged above the openings through which the readings are made and this panel may be marked to designate the particular chamber with which the corresponding instrument unit is connected. In the rear of the panel 32 are disposed electric light bulbs 33 for illuminating the characters on the panel. These bulbs are arranged in a chamber 34 which is separated from the instrument by the glass partition 30 and which is provided with ventilator openings at its top. The light bulbs 33 not only illuminate the panel 32, but also illuminate the front faces of the numeral wheels 25 so that they may be easily read.

Where pressures above atmospheric are indicated, the movement of the float 12 will be upward instead of downward.

The plates 17 are arranged in pairs, one at each side of the corresponding numeral wheel 25. The plates of a pair are held in fixed relation to each other by the shafts 16 and 24. The entire unit is thus self-contained and may be lifted bodily from the instrument frame if desired by removing the retaining screws 35 from the supporting lugs 18. An adjustment arm 36 extends outwardly from one of the plates of each pair and is connected at is lower end to an adjustment screw 37. Each unit may be individually shifted on its pivotal supports 18 by adjusting the corresponding screw 37. Movement of the unit about each pivotal support will change the position of the shaft 24 relative to the shaft 16 and thus produce a slight rotation of the numeral wheel 25 about its axis. In this way the wheel may be accurately adjusted to its zero position.

It has been found in practice that an instrument of this kind is impractical unless some means is provided for damping the vibrations. In order to produce what may be termed a practically dead-beat instrument, the numeral wheels 25 are made in the form of hollow stamped metal wheels, as shown in Fig. 1. Within each of the numeral wheels is placed a permanent magnet 38 supported on one of the plates 17. The magnet is arranged with its pole pieces adjacent the rim 39 of the numeral wheel and a soft iron bar or keeper 40 is arranged adjacent the outer face of the rim 39 in registration with the pole pieces of the magnet 38. By this arrangement the lines of force set up by the magnet 38 penetrate the rim 39 so that rotation of the numeral wheel will tend to set up eddy currents of electricity in the rim. This of course will resist rotation of the wheel and bring it to rest, thus avoiding the vibrations which would otherwise be present and producing a dead-beat instrument.

We claim:—

1. A gauge comprising a vertically movable hollow float, means for connecting the interior of said float with a source of pressure, an indicating wheel, an adjustable means for supporting said wheel, and means for connecting said wheel with said float for indicating a function of the pressure to which said float is connected.

2. A pressure gauge comprising a well, a hollow float supported by liquid in said well, a lever connected with said float, a pendulum weight secured to said lever and depending from the fulcrum thereof, a rotary wheel, a gear segment connected with said lever, and a pinion secured to said wheel and meshing with said gear segment to rotate said wheel when said float is moved vertically.

3. A pressure indicating instrument comprising indicating apparatus, a housing for enclosing said apparatus, a light source within said housing for illuminating said apparatus, said housing having a transparent wall illuminated by said light source and having characters thereon for designating the character of the readings of said instrument, and a partition for separating said light source from said apparatus.

4. A pressure indicating instrument comprising an indicating wheel, a casing for said wheel, partition walls forming a chamber adjacent said wheel, and a light source disposed within said chamber, said chamber having a transparent wall illuminated by said light source and having characters thereon for designating the nature of the indications of said wheel.

5. A pressure indicating instrument comprising a plurality of indicating wheels arranged side by side, a panel disposed adjacent said wheels and having designations for different ones of said wheels, a source of light disposed in the rear of said panel, and means for separating said source of light from said wheels.

6. A pressure indicating instrument comprising an elongated well, bearing members supported from said well and extending forwardly therefrom, indicator wheels journaled in said bearing members, floats disposed side by side in said well, and means connecting each of said floats with the corresponding wheel to rotate said wheels.

7. A pressure indicating instrument comprising a rotary wheel having indicating characters on the periphery thereof, pressure actuated means for rotating said wheel, a pendulum means operating connecting said pendulum with said wheel for normally returning said wheel to zero position and a damping device for arresting rotation of said wheel.

8. A pressure indicating instrument comprising a dished sheet metal wheel having a peripheral rim, pressure actuated means for rotating said wheel, a pendulum means operatively connecting said pendulum with said wheel for normally returning said wheel to zero position, a magnet disposed within said wheel, with the pole pieces thereof adjacent the inner face of said rim and a keeper for said magnet arranged in registration with said pole pieces at the opposite side of said rim from said magnet.

9. A draft or pressure gauge comprising a character wheel, float means connected with said wheel for rotating the same, means for connecting said float means to a source of pressure, a pendulum for said wheel, means operatively connecting said pendulum with said wheel for returning said wheel to zero position, and a damping device associated with said wheel.

10. A gauge for registering a function of a pressure comprising a dished sheet metal character wheel having a peripheral rim provided with characters on the outer surface thereof, a float, means operatively connecting said float with said wheel, means for connecting said float to a source of pressure, an adjustable support for said wheel, a pendulum, means operatively connecting said pendulum to said wheel, means for moving said support to effect zero adjustment of said wheel, and magnetic means for inducing eddy currents in said wheel to effect damping of said wheel when rotated.

11. A pressure indicating device comprising a rotary character wheel having a spindle, pressure actuated means for rotating said spindle, an adjustable support for said spindle, a pendulum connected with said means to vibrate when said wheel is oscillated, and means for adjusting said support to effect zero setting of said wheel.

12. A multiple draft and pressure gauge comprising a tank, pipes adjacent the bottom of said tank and extending upwardly into said tank above the normal liquid level in said tank, bell floats arranged over said pipes and extending downwardly into the liquid to be sealed thereby, indicating wheels, connections between said indicating wheels and said floats, supports for said indicating wheels, and means for adjusting said supports to thereby vary the relation of the operative connections between said indicating wheels and said floats.

13. A pressure indicating device comprising indicating means including fixed and movable elements, pressure actuated means for actuating said movable elements, and adjustable support for said movable elements, and means for adjusting said support to effect zero setting of said indicating means.

14. A pressure indicating device comprising indicating means including a rotary character wheel, a pressure actuated means for actuating said wheel, an adjustable support for said wheel, and means for adjusting said support to effect zero setting of said wheel.

15. A pressure indicating instrument comprising a rotary wheel having a sheet metal rim, pressure actuated means for rotating said wheel, and a magnet disposed within said wheel with the pole pieces thereof adjacent the inner face of said rim for inducing eddy currents therein to produce a damping effect on the rotation of said wheel.

In testimony whereof we have signed our names to this specification on this 17th day of June A. D. 1925.

ARTHUR B CUNNINGHAM.
ALBERT F. SPITZGLASS.